United States Patent [19]
Kitagawa et al.

[11] Patent Number: 6,032,857
[45] Date of Patent: Mar. 7, 2000

[54] ELECTRONIC MONEY SYSTEM

[75] Inventors: Hiroki Kitagawa, Tokyo; Yo Miyamoto, Fuchu; Jun Furuta, Kokubunji; Masaki Takano, Musashino; Takashi Matsubara, Kodaira; Takao Ohsawa, Niiza, all of Japan

[73] Assignee: Hitachi, Ltd., Tokyo, Japan

[21] Appl. No.: 08/807,630

[22] Filed: Feb. 27, 1997

[30] Foreign Application Priority Data

Feb. 29, 1996 [JP] Japan .................................. 8-042792

[51] Int. Cl.⁷ .................................................. G06F 17/60
[52] U.S. Cl. .......................................... 235/379; 902/24
[58] Field of Search ..................................... 235/379, 380

[56] References Cited

U.S. PATENT DOCUMENTS 5,453,601  9/1995  Rosen ....................................... 235/379

FOREIGN PATENT DOCUMENTS

| 172670A | 2/1986 | European Pat. Off. . |
| 542298A | 5/1993 | European Pat. Off. . |
| 653717A | 5/1995 | European Pat. Off. . |
| 686947A | 12/1995 | European Pat. Off. . |
| 4203748A | 8/1993 | Germany . |
| 62-25372 | 2/1987 | Japan . |
| 4-233097 | 8/1992 | Japan . |
| 7-334587 | 12/1995 | Japan . |
| WO9113411A | 9/1991 | WIPO . |

OTHER PUBLICATIONS

Mondex Magazine, Launch Issue, Jul., 1995.

*Primary Examiner*—Harold I. Pitts
*Attorney, Agent, or Firm*—Beall Law Offices

[57] ABSTRACT

An electronic money system has an IC card for electronic money having a memory for maintaining money deposit and money debit information and another memory, such as an EPROM, for storing transaction data, including detailed information of transactions, such as the content of a typical receipt received from a retail store. The transaction information can be used at a later time in a personal computer so that an electronic record of household expenses can be maintained The transaction data that is stored includes the product name, price of the product, quantity of the product purchased and similar details of the transaction. The IC card memory can record the name and telephone number of a retail store where the card has been used or a network address can be recorded in the memory for use by a customer to access electronic direct-mail information by using a PC. Also, a store can determine whether a particular purchase is within a range of average purchases in terms of the number of products being purchased in a transaction and the total cost of the transaction, based on the stored transaction information.

9 Claims, 10 Drawing Sheets

FIG. 4B

RECORDED TRANSACTION INFORMATION IN MEMORY 103

| TRANSACTION DATE TIME | PRICE | COMMODITY (PRODUCT) | SUPPLIER (BRAND) | QUANTITY | ADDITIONAL INFORMATION |
|---|---|---|---|---|---|
| 2/10  10:30 | $1.00 | RADISH | | | |
| 2/10  10:31 | $6.00 | PORK | | 300g | |
| 2/10  10:32 | $5.00 | DETERGENT | | | |
| 2/10  10:33 | $25.00 | SWEATSHIRT | MAKER A | | (50% OFF) MUTI MEDIA ADDRESS FOR DIRECT MAIL (/http:WWW.XX.or.XXX) |

ELECTRONIC MONEY SYSTEM

FIELD OF THE INVENTION

The present invention relates to an electronic money system using an IC card and, in particular, to an electronic money system in which an IC card storing electronic money is used for small payments of electronic money. Transaction information details, such as the purchase record associated with the transfer of the electronic money and its classification of use, are stored in a memory on the IC card as transaction information so that management of electronic money and network access can be easily and safely performed by using such stored information.

BACKGROUND OF THE INVENTION

In recent years, it has been proposed to provide an electronic money system in which the transfer of electronic money is performed by communication between IC cards in which electronic money is stored. Each of the IC cards used in this system includes a microprocessor which has a communication function inside, and a memory made from an EEPROM or the like which stores a processing program and the balance of electronic money. Electronic money can be transferred from one IC card to another by using a dedicated terminal or via the electronic money system which has terminals provided at banks, stores, individual residences and the like that can be arbitrarily connected to each other via communication lines.

SUMMARY OF THE INVENTION

The aforesaid proposed electronic money system is a system under development in that it has not yet been determined what function and form should be given to each device that constitutes part of the system.

An object of the present invention is to provide an electronic money system which makes it possible to access the electronic money system or a network from peripheral devices, such as a personal computer (hereinafter referred to as "PC") and an electronic wallet, through as easy a manipulation as possible, so that convenience of use for customers can be ensured and so that human errors occurring during transfer of the electronic money can be reduced.

Another object of the present invention is to provide an electronic money system in which, by making the best use of the transaction data storing function of an IC chip for electronic money provided in an IC card, it is possible to store transaction information details having more contents in one IC card without the need to change the function of the IC chip for electronic money itself, so that the stored transaction information details can be used for management of household expenses.

Another object of the present invention is to provide an electronic money system which transfers address information about a network as part of the transaction information details of the electronic money so that customers can access commercial information on a network from their home, thereby making it possible to transmit large amounts of commercial information to potential customers.

Another object of the present invention is to provide an electronic money system which calculates the average purchase pattern of a customer, such as the average amount of electronic money spent by a customer or the average number of commodities purchased by the customer, from transaction information details and, if a transaction which greatly deviates from the pattern is to be performed, automatically issues a warning so that human error or unauthorized use of the IC card can be prevented.

To achieve the above objects, in accordance with the present invention, there is provided an electronic money system using IC cards arranged to transfer electronic money by communication of a signal between the IC cards, wherein memory IC chips are respectively provided on the IC cards and transaction information details, such as the purchase record associated with the transfer of the electronic money and its classification of use, are stored in the memories on the IC cards.

The transaction information details include detailed information about the purchases made with the IC card, such as the names of the commodities purchased, the classification of use and the like and detailed information using transaction information about the electronic money as an index. The detailed information is stored on the IC card and then read by a personal computer or special purpose data processor and the like so that it can be used for management of expenses made with the IC card, such as personal or household expenses.

The transaction information details also include commodity information sent by mail or a network address on a network which can be accessed to provide commodity information. The transaction information details can be used for accessing a network such as the internet and obtaining commodity information directly as well as by direct mail in the case of obtaining a large amount of information. It is understood that receiving information by mail means receiving and storing electronic mail as part of the transaction information details Since the present invention uses an IC card having the above-described arrangement, the transaction information recorded in the IC chip for the electronic money is used as an index to store transaction information details corresponding to each transaction that are stored in a memory chip provided on the same IC card, so that the transaction information and the transaction information details can be made to correspond with each other. Accordingly, if an IC card is used together with dedicated information devices in the present invention, such as electronic wallets and PCs, it is possible to virtually increase the amount of transaction information per transaction.

In addition, during a transaction using electronic money, it is possible to transmit information, such as direct mail, to the memory provided in the IC card. It is also possible to transfer only an address or channel information, such as an Internet or a CATV address, to the memory as the transaction information details of electronic money. In this case, a customer can easily obtain the desired information provided by a network, by transferring the address or the channel information from the IC card to an external information device, such as a PC or a CATV, and access the network by using the address or the channel information.

In addition, if the customer makes a purchase by using such an IC card, a retail store reads the card and calculates the average purchase pattern of the customer, such as the average amount of electronic money spent by the customer per transaction or per commodity or the average number of commodities purchased by the customer each transaction, from the transaction information details recorded in the IC card, so that if the customer performs a transaction which greatly deviates from the pattern, it is possible to automatically issue a warning to prevent error or unauthorized use of the IC card.

BRIEF DESCRIPTION OF THE DRAWINGS

FIG. 4B is a table showing the details of the transaction information recorded in memory 103 of the IC card, as shown in FIG. 4A.

DETAILED DESCRIPTION OF THE PREFERRED EMBODIMENTS

One embodiment of an electronic money system using an IC card according to the present invention will be described below in detail with reference to the accompanying drawings.

Figure 1:
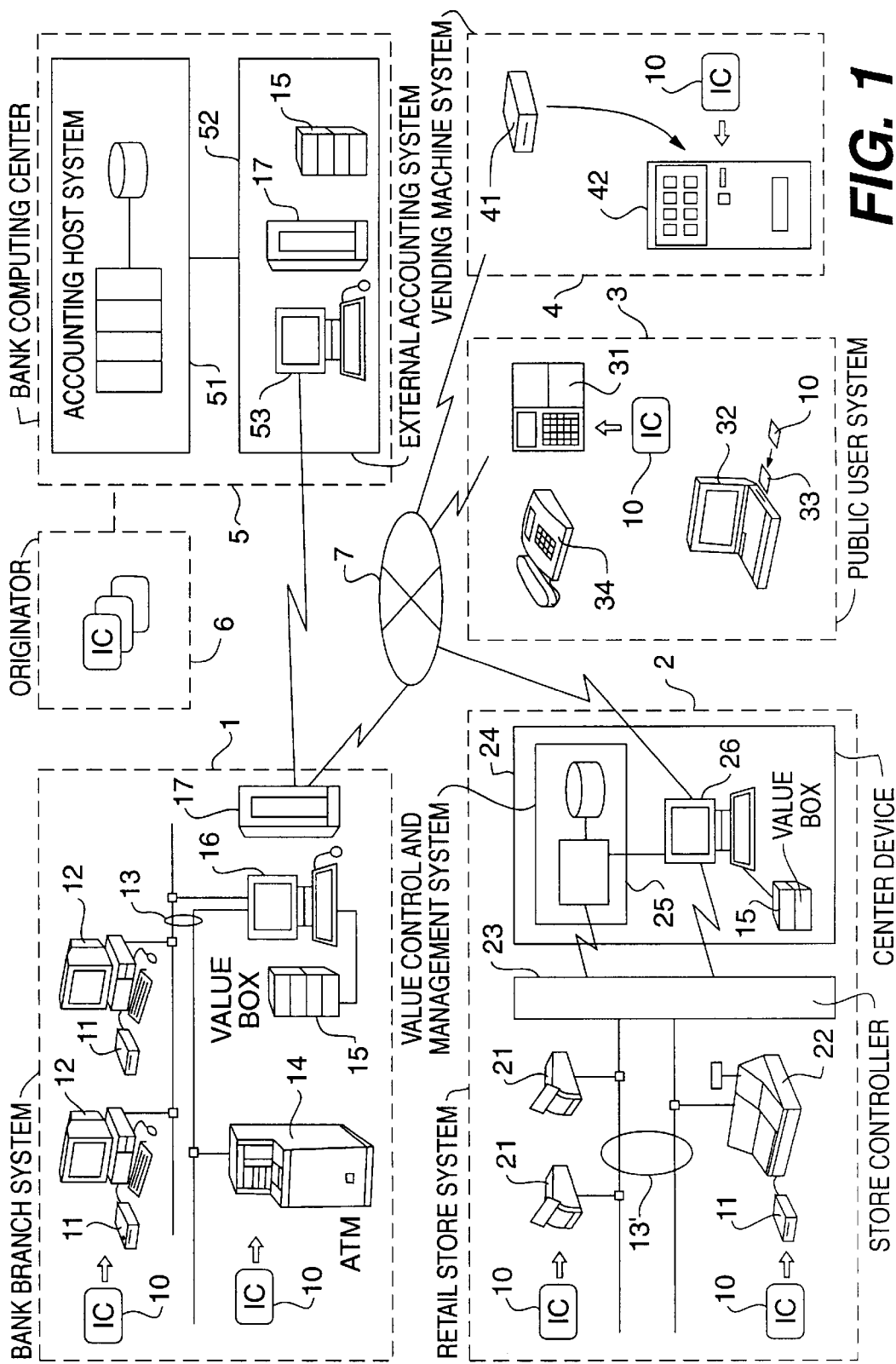
FIG. 1 is a block diagram showing an arrangement of an electronic money system according to the present invention.

As shown in FIG. 1, the electronic money system according to an embodiment of the present invention, has a bank branch system 1, a retail store system 2, a public user system 3, a vending machine system 4, a bank computing system 5, and IC card originator 6, and a network 7, such as a private or public telephone line supported network such as the Internet.

The electronic money system uses an IC card 10, which is shown in FIG. 1 can be read by various devices within the money system. For example, the bank branch system and retail store system use an external IC card reader/writer 11 connected to a banking teller terminal 12, in the bank branch system, or POS (point of sale) terminal 22 in the retail store system.

Within the bank branch system 1, banking teller terminals 12 are provided for accepting payments with the associated card reader/writers 11. The banking teller terminals 12 are connected to the transaction management terminal for electronic money 16 through an internal communication line 13. A value box 15 and a relay computer are connected to transaction management terminal 16. Further, an automated teller machine 14 is connected to terminal 16 through the internal communication line 13.

In the retail store system, the IC card 10 can be inserted into a POS terminal 21, which directly accepts an IC card or a POS terminal 22, which has been modified to include an external IC card reader-writer. The POS terminals 21 and 22 are connected to the internal communication line 13' that is connected to a store controller 23 that exchanges information with a center device 24. The center device 24 has a value control and management system 25 and a work station 26 to which is connected a value box 15.

In the public user system, a personal computer 32 is shown having the capability of perceiving IC card 10 by use of a PC-card type card reader/writer that fits in a PC MCIA card slot, for example. The public user system is connected to the network 7 by a telephone 34 and includes an electronic wallet 31 which also can receive IC card 10.

Within the vending machine system 4 is a vending machine 42 which can receive an IC card 10. An IC card reader/writer 41 is provided for accepting the IC card.

The banking computer center 5 includes an accounting host system 51 and an external accounting system 52. An external management terminal 53, relay computer 17 and value box 15 is provided within the external accounting system 52, as shown. Within the accounting host system 1 is a computer with storage.

It is contemplated that the retail store system 2 would be provided in a large-scale store, such as a department store or supermarket. Further, the vending machine system 4 is shown connected to the public telephone system or network 7, however the vending machine does not have to be connected, as shown. Further, although 4 representative systems are shown connected together by a telephone system, this is not the only connection possible, since any of the systems may be connected to one or more of the other systems by a private communications link, such as a dedicated line, lease line, microwave or satellite link. All such links are also available for the link between the originator 6 and the bank computing center 5.

The IC card 10 includes a microprocessor which has a communication function and a memory made from an EEPROM, for example, or the like which stores a processing program and the balance of electronic money. Each individual who is a public user of the money system possesses an IC card 10, and each of the banks, stores, vending machines and the like which participate in the electronic money system also possesses an IC card 10.

The public user system 3 is mainly an individual user system, and may be merely the electronic wallet 31 which is capable of displaying the balance of electronic money stored in an IC card. This electronic wallet 31 may have an additional function such as an electronic calculator. The personal computer 32, which is possessed by an individual, is provided with the PC-card type card reader/writer 33 for the purpose of electronic money payment, and is arranged to be connectable to the public telephone line 7. The public user system 3 may also use the IC card telephone 34 in which a processing function for the IC card 10 which stores electronic money is added to a normal telephone.

Each of the normal POS terminal 22 and the IC card telephone 34 in the aforesaid public user system 3 is provided with two IC card reader/writers for two IC cards so that electronic money can be transferred between two IC cards. Accordingly, each of the normal POS terminal 22 and the IC card telephone 34 can be made to perform processing similar to the normal handling of money, such as the transfer of electronic money from an IC card of one family member to another.

The method of using the electronic money system to which the present invention having the above-described arrangement is applied will be described below.

The IC cards 10 originate from an originator 6 and are distributed to a bank, a store, a vending machine, an individual and the like that participate in the system. The bank receives electronic money in exchange for normally circulating cash, and stores the electronic money in the value box 15 provided in the external accounting system 52. Inside value box 15 is stored a multiplicity of IC cards 10, and the electronic money received from the originator 6 is distributed among and stored in the IC cards 10. The electronic money stored in the IC cards stored in the value box 15 of the external accounting system 52 is distributed among the IC cards 10 stored in the value box 15 of the bank branch system 1 installed at each bank branch system.

The individual who is a public user participating in the electronic money system possesses a distributed IC card 10. The individual exchanges a deposit in his/her own bank account for electronic money and withdraws the electronic money to store it in his/her own IC card 10, through the banking teller terminal 12 or the auto teller machine 14 of the bank branch system 1. In addition, the individual can connect his/her personal computer 32 having a suitable card reader, such as the PC-card type card reader/writer 33 may connect his/her IC card telephone 34 to the bank branch system 1 via the public telephone line 7, thereby exchanging the deposit in his/her own bank account for electronic money and withdrawing the electronic money to store it in his/her own IC card 10.

During the withdrawal of the aforesaid electronic money, the IC card possessed by the individual is connected to an IC card in the value box 15 of the bank branch system 1 via the IC card reader/writer of the banking teller terminal 12, the auto teller machine 14, the personal computer 32 or the IC card telephone 34, by the communication function incorporated in the individual's IC card. Then, the electronic money stored in the IC card 10 in the value box 15 of the bank branch system 1 is stored in the IC card 10 possessed by the individual, under the control of the transaction management terminal for electronic money 16. At this time, the amount stored in the IC card 10 possessed by the individual is subtracted from the balance of the electronic money stored in the IC card 10 in the value box 15 of the bank branch system 1. The withdrawal of the deposit from the individual's account is carried out in a manner similar to that conventionally practiced by banks.

Although the above description states that the individual withdraws the deposit from his/her own bank account and stores it in the IC card possessed by the individual, the individual may carry cash to a window of the bank or a window of the originator so that the cash can be stored in the IC card.

The electronic money stored in the IC card can also be returned to the IC card in the value box 15 of the bank branch system 1 via the banking teller terminal 12, the auto teller machine 14 or the personal computer 32 and, at the same time, can be deposited in his/her own account.

Users who have stored electronic money in their IC cards in the above-described manner can purchase commodities or receive various services by using the IC cards at various stores or the like in a manner similar to using cash.

It is assumed that in a store, a user who has stored electronic money in his/her IC card, selects a commodity and carries the commodity to a POS-terminal counter for the purpose of payment. A handling operator inputs the selling price of the commodity through the POS terminal 21 or 22 by scanning a bar code or the like in a manner similar to that of processing a normal cash transaction, and causes the total to be computed and asks the customer to pay for the total.

If the customer pays with the IC card in which electronic money is stored, not in cash, the customer inserts the IC card into a card slot of the POS terminal for electronic money 21 or into the IC card reader/writer 11 connected to the normal POS terminal 22. Thus, the IC card of the customer and one of the IC cards in the value box 15 installed in the centre device 24 of the store are connected to each other via the internal communication line 13 and the work station 26, so that the electronic money stored in the IC card of the customer is transferred to the one IC card in the value box 15 installed in the centre device 24 and a receipt is output from the POS terminal to complete the payment transaction for purchasing the commodity. In this case, the electronic money stored in the IC card of the customer is decreased by the amount paid for by the purchase transaction, and this amount is added to the electronic money of the IC card of the store.

The above description has been made on the assumption that payment for the purchase of commodities is performed in the retail store system which is provided with a multiplicity of POS terminals and a centre device 24 having a value box which stores a multiplicity of IC cards. However, in the case of a smaller store or the like which uses a system provided with only one deposit terminal, an IC card reader/writer for the IC card of each customer may be provided at the deposit terminal and the IC card possessed by the store may be provided in the inside of the deposit terminal so that payment of electronic money can be performed with the IC card of a customer connected via the IC card reader/writer to the IC card possessed by the store. As described above, the electronic money in the IC card possessed by the store can be deposited in a bank account or can be cashed at a bank window.

In addition, in the retail store system having the above-described POS terminals, as an alternative, IC cards may be provided in the respective POS terminals, and a transfer of money to or from the IC card of a customer may be temporarily carried out between the IC card of the customer and one of the IC cards provided in the POS terminals, so that money can be transferred from the POS terminal to the IC card in the value box 15 of the centre device 24, as required.

If a vending machine 42 or the like is involved in the electronic money system, the vending machine 42 may be provided with an IC card reader/writer 41 and an IC card may be provided in the vending machine itself so that a transfer of money can occur between an IC card inserted into the IC card reader/writer 41 by a customer and the IC card provided in the vending machine.

The embodiment of the electronic money system according to the present invention using the above-described electronic money system will be described below with reference to the accompanying drawings.

Figure 2:
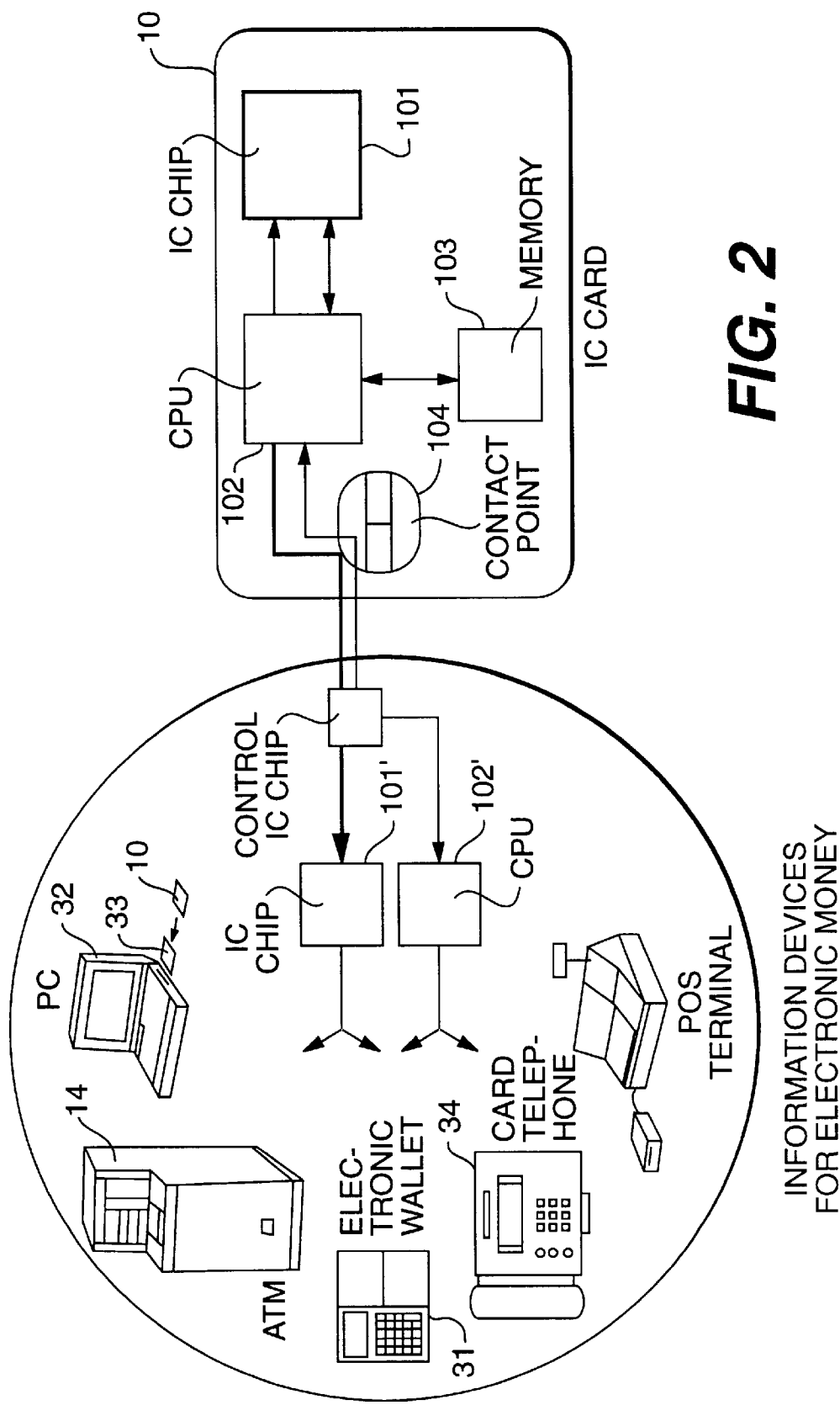
FIG. 2 is a diagram showing the relationship between the internal components of the IC card in block diagram form and various information devices for the electronic money system shown in FIG. 1.

FIG. 2 is a diagram of the internal arrangement of an IC card for use in the present invention and information devices for the electronic money system described above with reference to FIG. 1. Components identified by reference numerals that are identical to those shown in FIG. 1 are not further described.

The IC card 10 for use in the present invention is provided with an IC chip for electronic money 101, a control CPU 102, and a memory 103 made from an EPROM or the like. This IC card 10, when inserted into an information device for the electronic money system, is connected to an IC chip for electronic money 101' and a CPU 102' of the information device for the electronic money system via the IC card contact point 104 and the control IC chip 105, so that a transfer of electronic money can be performed between the IC card 10 and the information device for the electronic money system, as described above with reference to FIG. 1.

As one feature, electronic money has the function of holding a transaction record, unlike cash. Each time electronic money is used for a transaction, transaction information which includes contents such as the card ID, the date of the transaction and the amount of money is recorded in the memory provided in the IC chip for electronic money 101. However, at present, only transaction information for the most recent ten transactions or so can be recorded because of the limited capacity of the memory provided in the IC chip 101. Accordingly, the contents of the transaction information are limited to extremely simple data such as the card ID, the date of the transaction and of the amount of money paid in the transaction.

The IC card 10 according to the preferred embodiment of the present invention is constructed in such a way that the memory 103 made from an EPROM or the like, can record, during the use of the electronic money, detailed information of the transaction like a receipt received from a retail store, such as a supermarket. Such information of the transaction can be used at a later time in an information device, such as a personal computer, for the purpose of management of transactions, such as an electronic record of categories of expenses including household expenses, or can be recorded in the memory of an external information device, such as an electronic wallet, other than the IC card for electronic money.

The memory 103 can record the name and the telephone number of the retail store as information about the retail store, in addition to the detailed information of a transaction like a receipt issued by the retail store. Further, the memory 103 can record network addresses in order to provide electronic direct-mail information to customers.

The above-described IC card 10 is suited to the case in which a user makes purchases using electronic money at a supermarket or the like and receives information of the transaction (hereinafter referred to as an "electronic receipt") and direct-mail information from a POS terminal device. The processing operation of the POS terminal device in this case, the electronic receipt and the contents of the direct-mail information will be described below.

Figure 3:
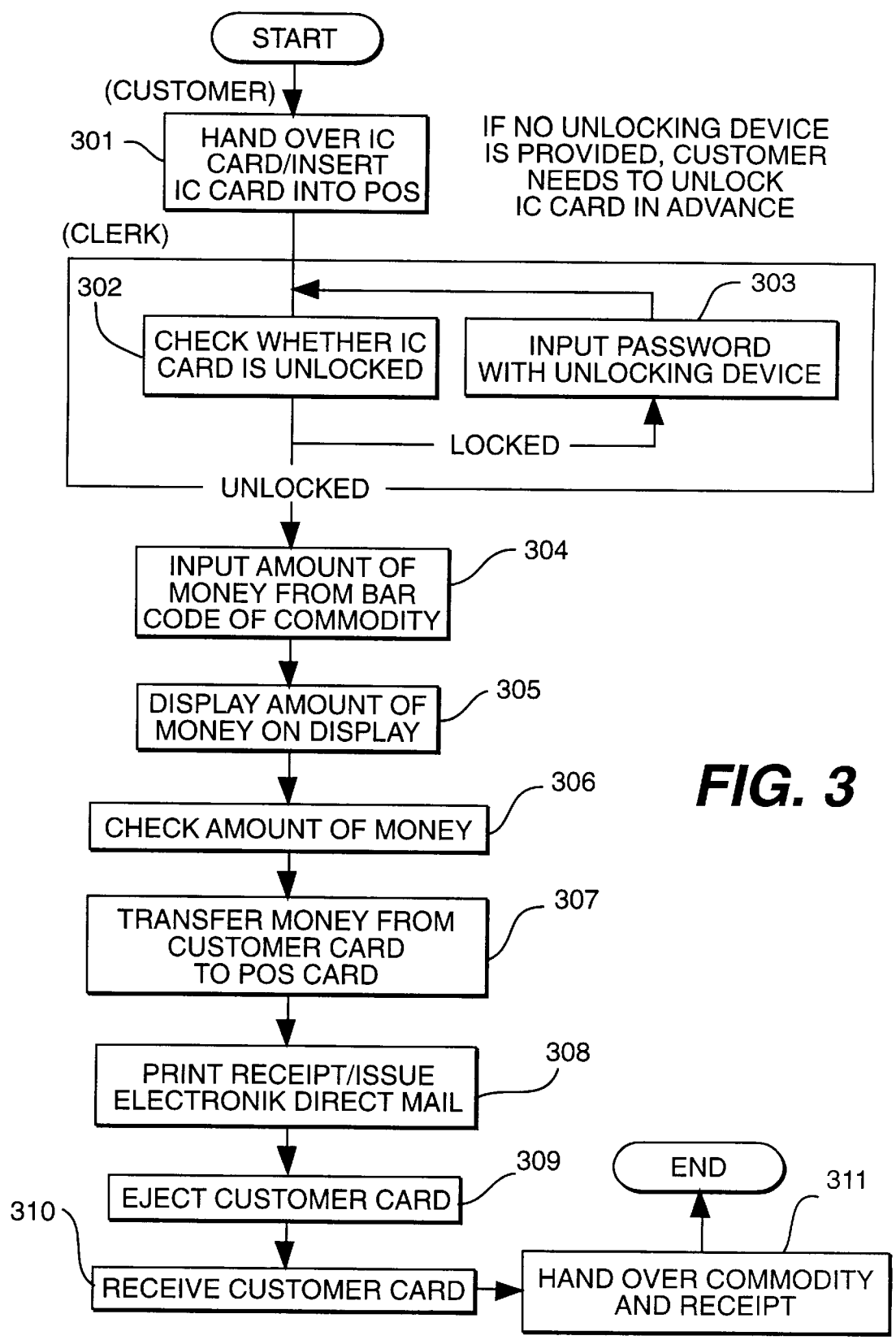
FIG. 3 is a flowchart showing the operation of a POS (Point of Sale) terminal device that issues an electronic receipt and sends direct mail to the IC card.

FIG. 3 is a flowchart showing the operation of the POS terminal device for issuing an electronic receipt and writing direct mail to the IC card. This flowchart will be described below.

(1) A customer selects a commodity and carries it to a POS counter for purchasing it with an IC card 10 in which electronic money is stored The IC card 10 is handed over to an operator of the POS terminal and inserted into the card reader/writer slot (Step 301).

(2) The customer checks whether the IC card is locked to disable payment of electronic money. If the IC card is locked, the customer unlocks the IC card 10 by inputting a password or by using an unlocking device or the like (Steps 302 and 303).

(3) A clerk sequentially inputs the price, the name and the like of the commodity from the bar code number (information obtained on the basis of the bar code read by a bar code, for example) or other commodity identifying information, and displays the total amount of money required to be paid on a display of the POS terminal device (Steps 304 and 305).

(4) The customer confirms the total amount of money, and the clerk transfers electronic money from the IC card 10 of the customer to an IC card provided in the POS terminal device (Steps 306 and 307).

(5) The POS terminal device prints out a receipt, and transfers an electronic receipt to the memory 103 of the IC card of the customer. If there is direct mail or the like to be transferred to the customer, the address of a network which provides the direct mail, for example, the address of a personal computer network, an Internet address or channel information about a CATV, is transferred to the memory 103 of the IC card of the customer (Step 308).

(6) The IC card is returned to the customer after being ejected from the POS terminal device, along with the commodity and the printed receipt (Steps 309 to 311).

By the above-described processing, the operation of issuing the electronic receipt and the direct mail to the IC card by means of the POS terminal device at the time of purchase of the commodity is completed.

In the above-described step 308, the electronic direct-mail information issued at the same time as the issuance of the receipt may be directed to only public users who have previously made contracts with a particular retail store (a major retail store group or the like), and may include invitation information, for example, to be written to the IC card, such as an invitation of a bargain sale or an event planned by the retail store. In this case, if the invitation information is a small amount of information which mainly consists of characters, the invitation information may be directly written to the memory 103 of the IC card. However, if the invitation information is a large amount of information like image information or if the invitation information is likely to vary frequently, only the address of advertisement information carried on a network, such as a personal computer network or the Internet, may be recorded in the IC card. In this way a public user can be provided with only the information required to access information at a later time, for example, to download information through a personal computer at his/her home.

If this is done, a memory having the minimum required memory capacity can be used for the memory 103 of the IC card. In addition, retail stores can provide information to customers every day, while public users can have easy access to only necessary information.

In the above-described step 308, if the electronic receipt is to be issued, the POS terminal device calculates the average purchase pattern of the customer, such as the average amount of electronic money spent by the customer or the average number of commodities purchased by the customer, from transaction information details which are stored in the memory 103 of the IC card 10 as information about the past purchases, so that if a transaction manipulation which greatly deviates from the pattern is to be performed, the POS terminal device can automatically issue a warning.

Figure 4A:
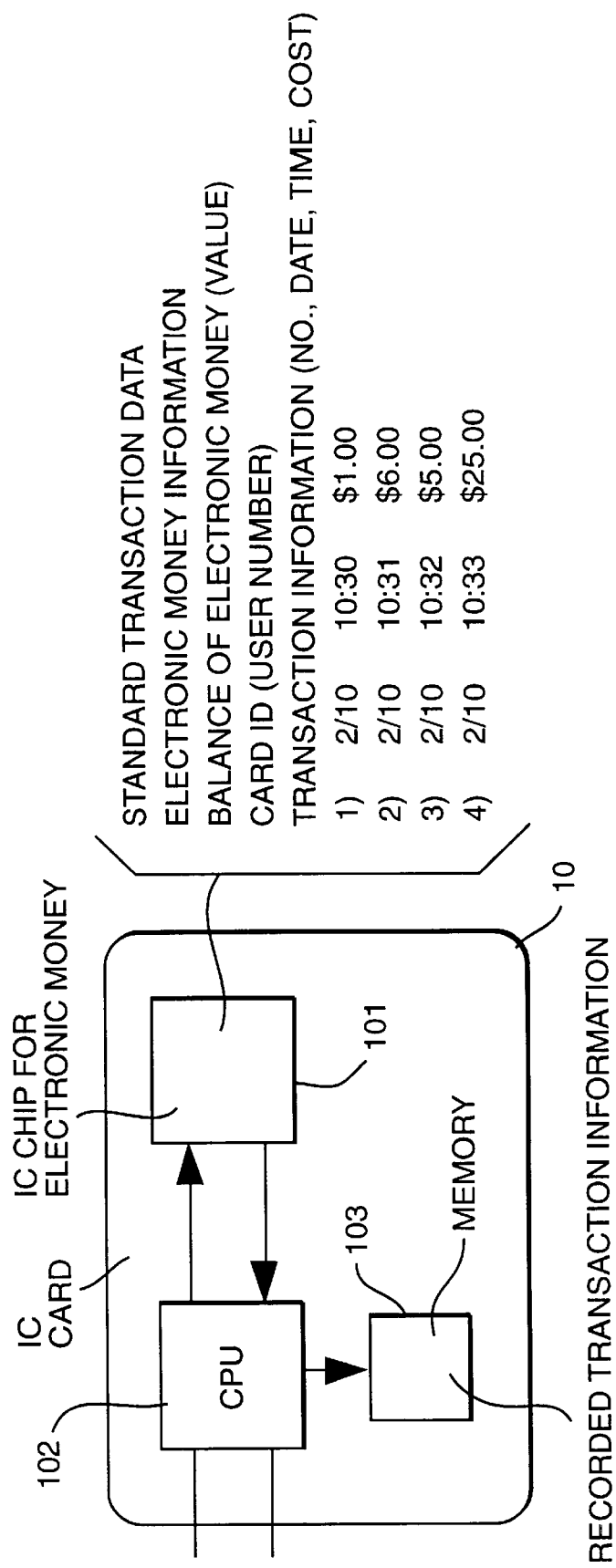
FIG. 4A is a diagram showing the details of the information written to the IC card in the purchase of commodities in a transaction according to the processing disclosed in FIG. 3.

FIG. 4A is a diagram showing the information which is written into the memory 103 of the IC card of the customer and into the IC chip for electronic money 101 by the processing described in FIG. 3. Such information will be described below. In the IC chip 101, the balance of electronic money, a card ID indicating the user number of the IC card, and the transaction information such as the latest purchases are recorded as electronic money information. The transaction information is information indicating, for example, the date, time and the amount of money of the purchases.

In the memory 103, as shown by the table in FIG. 4B, transaction information recorded, including an electronic receipt having contents similar to those of a receipt issued at the time of purchase, an address and brief contents of a network which provides direct mail (for example, the Internet) or the direct mail. The electronic receipt contains, in addition to the aforesaid transaction information recorded in the IC chip for electronic money, the name of the commodity of product purchased, the quantity if applicable, the brand name or supplier of the purchased commodity as well as additionaly information, for example bought at 50% off. This data can be used for management of categories of expenses, such as household expenses. The network address is used when direct mail is to be viewed by accessing the address of the network from a personal computer over a network.

After one or more transactions, the user of the IC card 10 inserts the IC card 10 into the card reader/writer 33 of a personal computer 32 (shown in FIG. 1) to read the electronic receipt. Then, software for recording household expenses, for example, can be opened for reading the transaction information and the user can perform management of household expenses using the input information. If the user uses a stored address to access a network, the user can also obtain commodity information found on the direct mail page.

Figure 5:
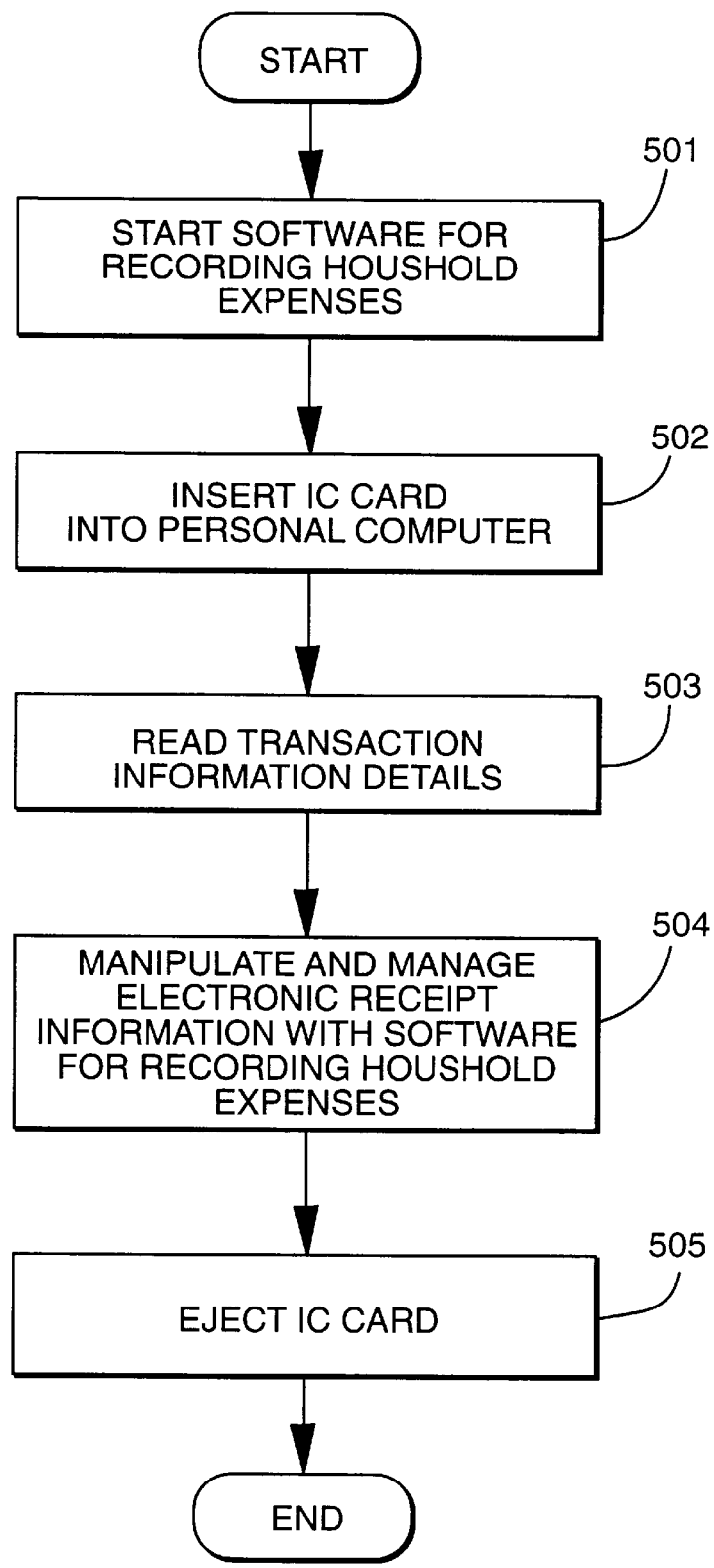
FIG. 5 is a flowchart showing the processing of reading an electronic receipt information recorded in an IC card into a personal computer and performing management of household expenses with the information.
Figure 6:
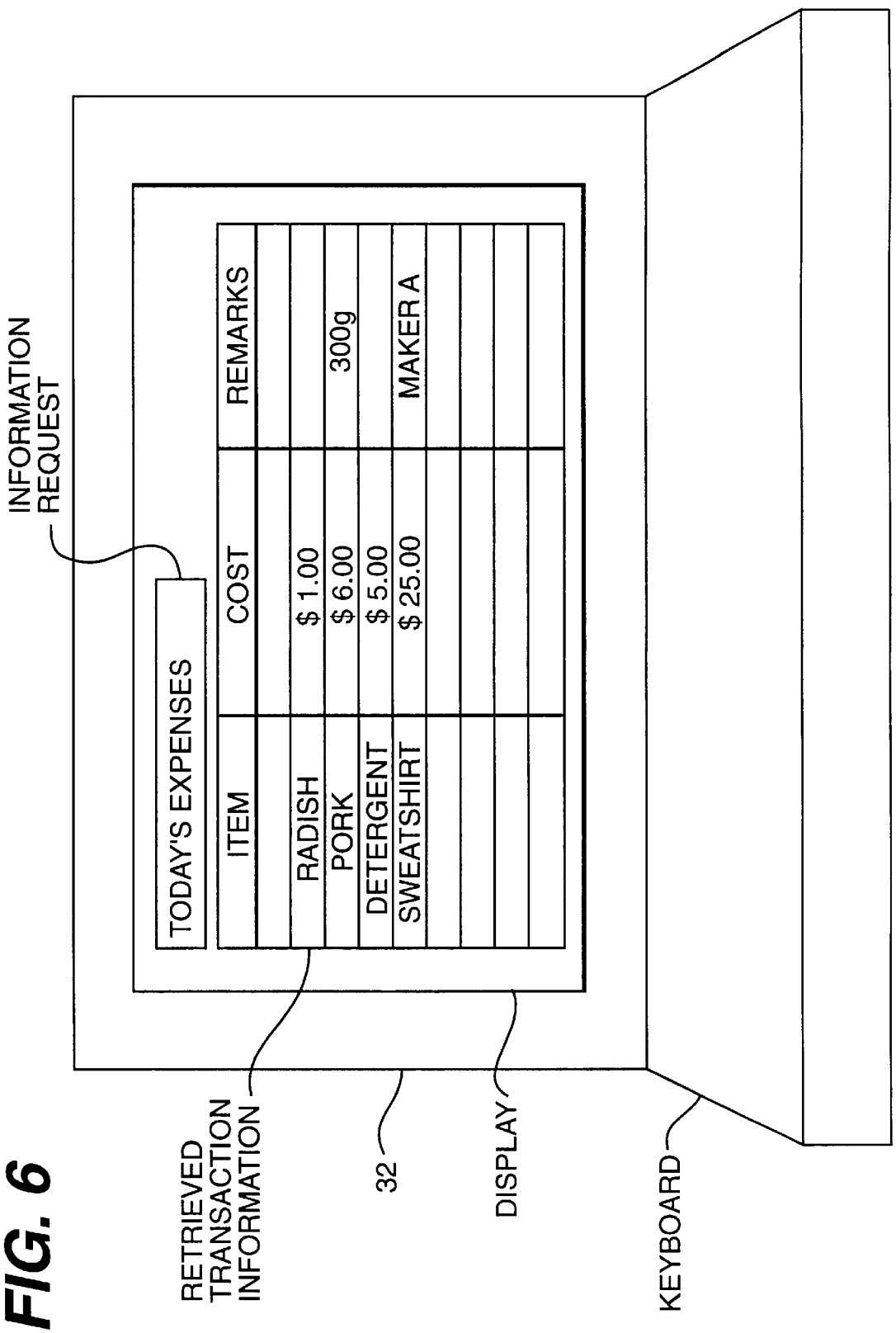
FIG. 6 is a view of a terminal or PC showing an example of the processing resulting from following the steps disclosed in FIG. 5.

FIG. 5 is a flowchart showing the processing of reading the electronic receipt information recorded in the IC card and loading it into a personal computer, and performing management of household expenses. FIG. 6 is a diagram describing an example of the result of the processing.

(1) A user, who made a purchase using electronic money stored in the IC card 10, turns on the personal computer 32 at home and starts software for recording household expenses (Step 501).

(2) Then, the user inserts the IC card 10 containing the electronic receipt of the purchase into the PC-card type card reader/writer 33 which is an interface with the personal computer 32 (Step 502).

(3) The PC-card type card reader/writer 33 reads from the memory 103 of the IC card 10 transaction information details which contain the electronic receipt and optionally a network address, and stores the transaction information details in a storage device provided in the personal computer 32 (Step 503).

(4) Software for recording household expenses, similar to a checking or banking software program, automatically lays out the contents of the electronic receipt contained in the read transaction information details, on a table which serves as a household account book. The software also automatically describes information, such as the name of the item, its cost and remarks in the table. At this time, the transaction information used as the electronic record of money transfers, which is contained in the original electronic money information stored in memory 101, is used as an index for identifying transaction information details for each transaction that are stored in memory 103.

The software is essentially a database program in which the transaction information read from memory 103 of an IC card is input. Categories of the information are treated as fields, which are searchable using information requests. As shown in FIG. 6, details of the contents of expenses on a requested date of purchase are shown, such as the name, price, quantity and name of manufacture of each purchased commodity. This information can be provided in the table in the same form as provided for in FIG. 4B. (Step 504).

(5) The user takes out the IC card 10 and completes the processing (Step 505).

Figure 7:
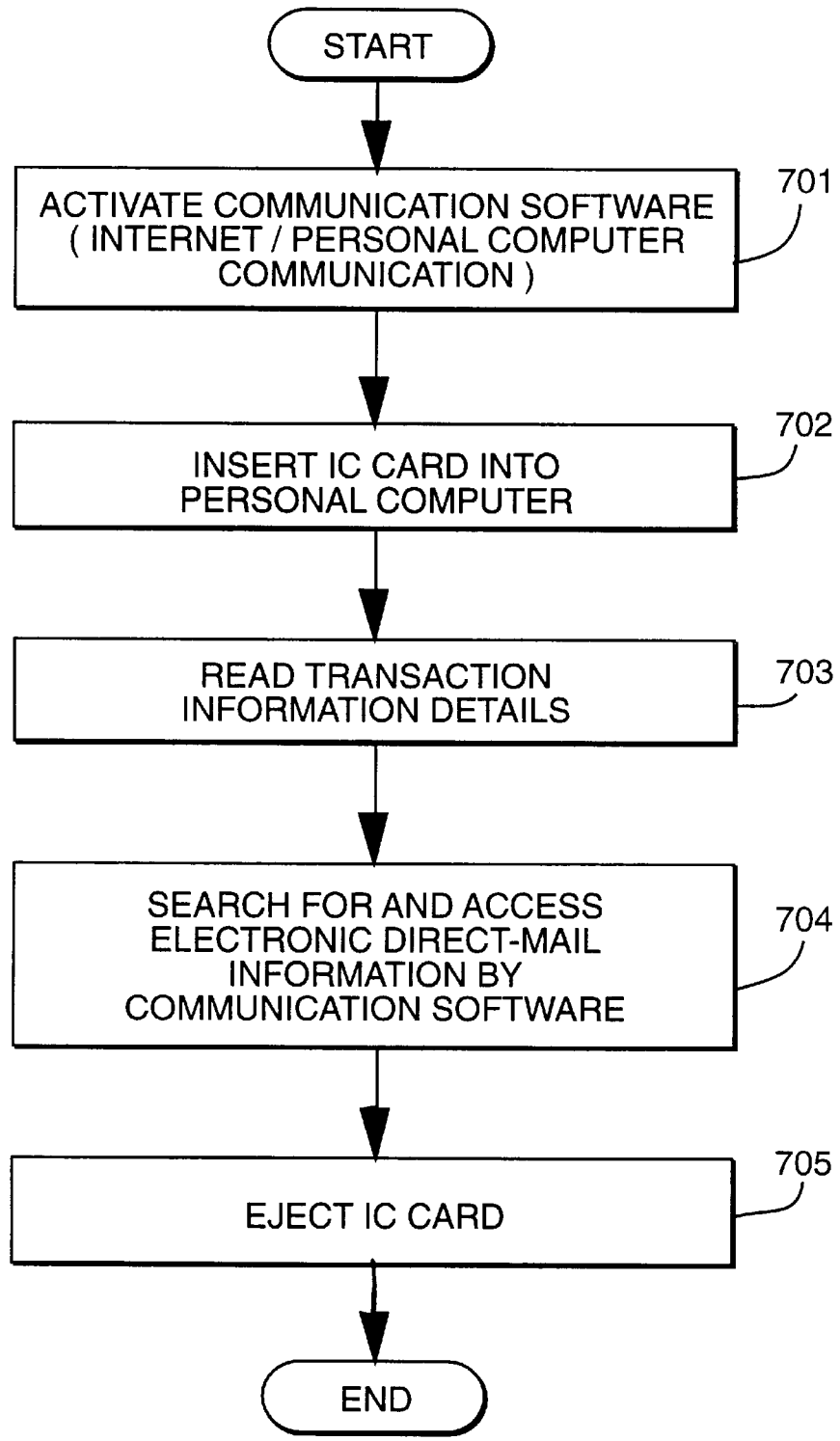
FIG. 7 is a flowchart showing the processing of reading the IC card with the personal computer to search for and retrieve a network address that provides direct mail, which address has been stored in the IC card as a result of a transaction.
Figure 8:
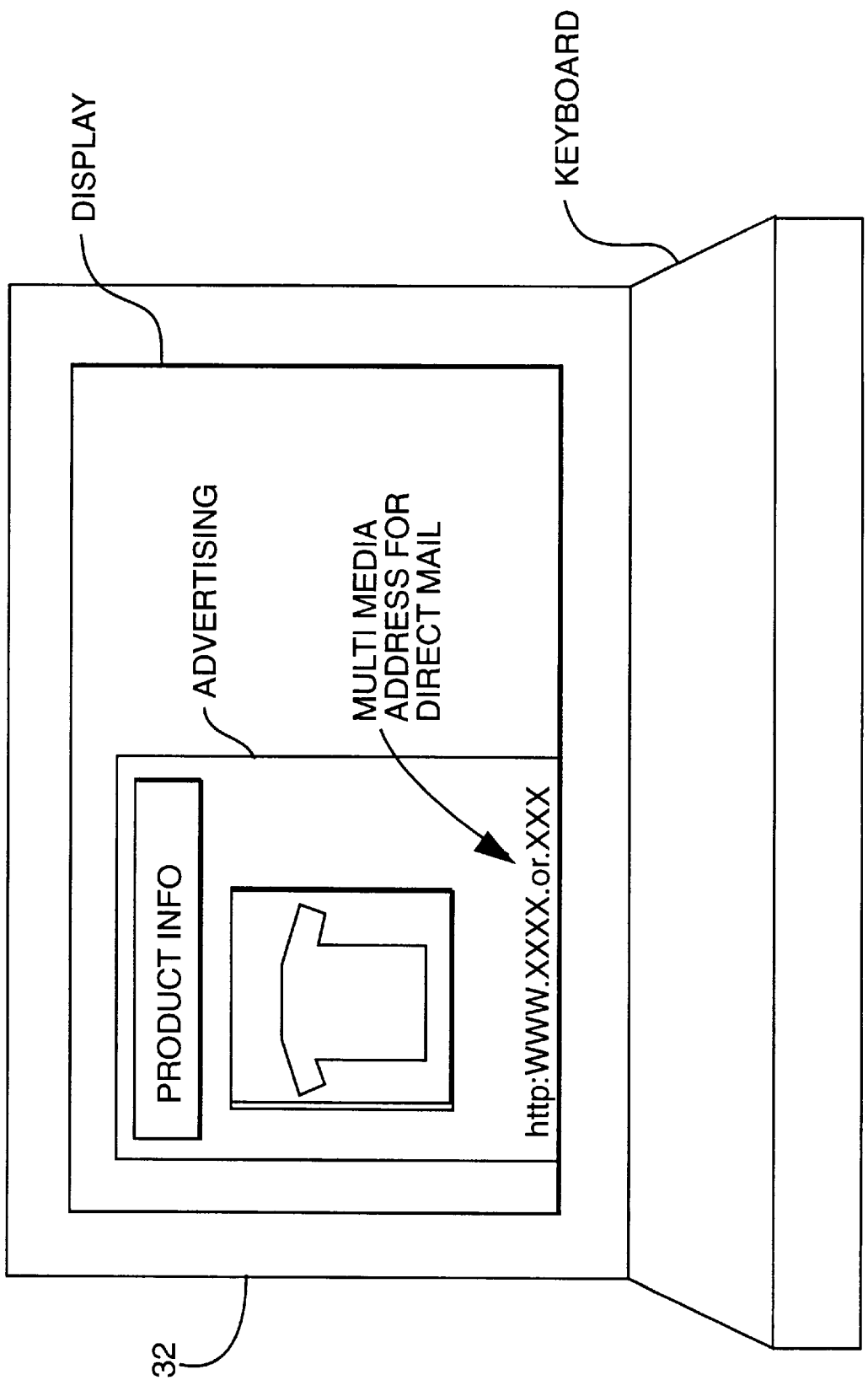
FIG. 8 is a diagram showing an example of the result of the processing of receiving direct mail according to the steps followed in the processing of FIG. 7.

FIG. 7 is a flowchart showing the processing of reading the address of a network which provides direct mail, which is recorded in an IC card, into a personal computer and viewing the direct mail, and FIG. 8 is a diagram describing an example of the result of the processing.

(1) The user, who made a purchase using electronic money stored in the IC card 10, turns on the personal computer 32 at home and starts communication software for the Internet, personal computer communication and the like (Step 701).

(2) Then, the user inserts the IC card 10 containing the electronic receipt of the purchase into the PC-card type card reader/writer 33 which is an interface with the personal computer 32 (Step 702).

(3) The PC-card type card reader/writer 33 reads from the memory 103 of the IC card 10 transaction information details which contain the electronic receipt and a network address, and stores the read transaction information details in the storage device provided in the personal computer 32 (Step 703).

(4) The communication software accesses the network to search for electronic direct-mail information by using the network address contained in the read transaction information details, and accesses and brings the information. In consequence, as shown in FIG. 8, the information, such as the photograph and price of an advertised commodity, is displayed on the display screen of the personal computer (Step 704).

(5) After viewing the advertisement of the commodity in Step 704, the user takes out the IC card 10 and completes the processing (Step 705).

The above-described embodiment of the present invention is arranged to perform reading of transaction information details from an IC card after starting software for recording household expenses or communication software. However, the present invention may also be arranged so that when an IC card is inserted, the operating system of a personal computer automatically reads transaction information details from the IC card and then starts the software for recording household expenses, the communication software or other software so as to utilize the transaction information details read by the operating system.

As described previously, according to the embodiment of the electronic money system of the present invention, the transaction information recorded in an IC chip for electronic money is used as an index to store transaction information details corresponding to each transaction in a memory chip, such as an EPROM, which is provided on the same IC card. In addition, the transaction information and the transaction information details can be made to correspond to each other by a CPU provided on the same IC card. Accordingly, if dedicated information devices, such as electronic wallets and PCs, for the electronic money system are used, it is possible to virtually increase the amount of transaction information per transaction.

The transaction information stored in the IC card is also able to be used by a retail store to determine if a transaction being attempted with the IC card is within a predetermined range of average transactions made using the IC card in the past. This determination is made by reading the transaction information stored in the card and calculating from the history of the transaction stored on the card whether the transaction being attempted is of the type within a range of normal transactions. If the transaction is not of a normal type, then the store personnel can be alerted to a possible atttempt of unauthorized use of the card or an error in the use of the card by the electronic money system equipment, by issuing an appropriate warning.

Figure 9:
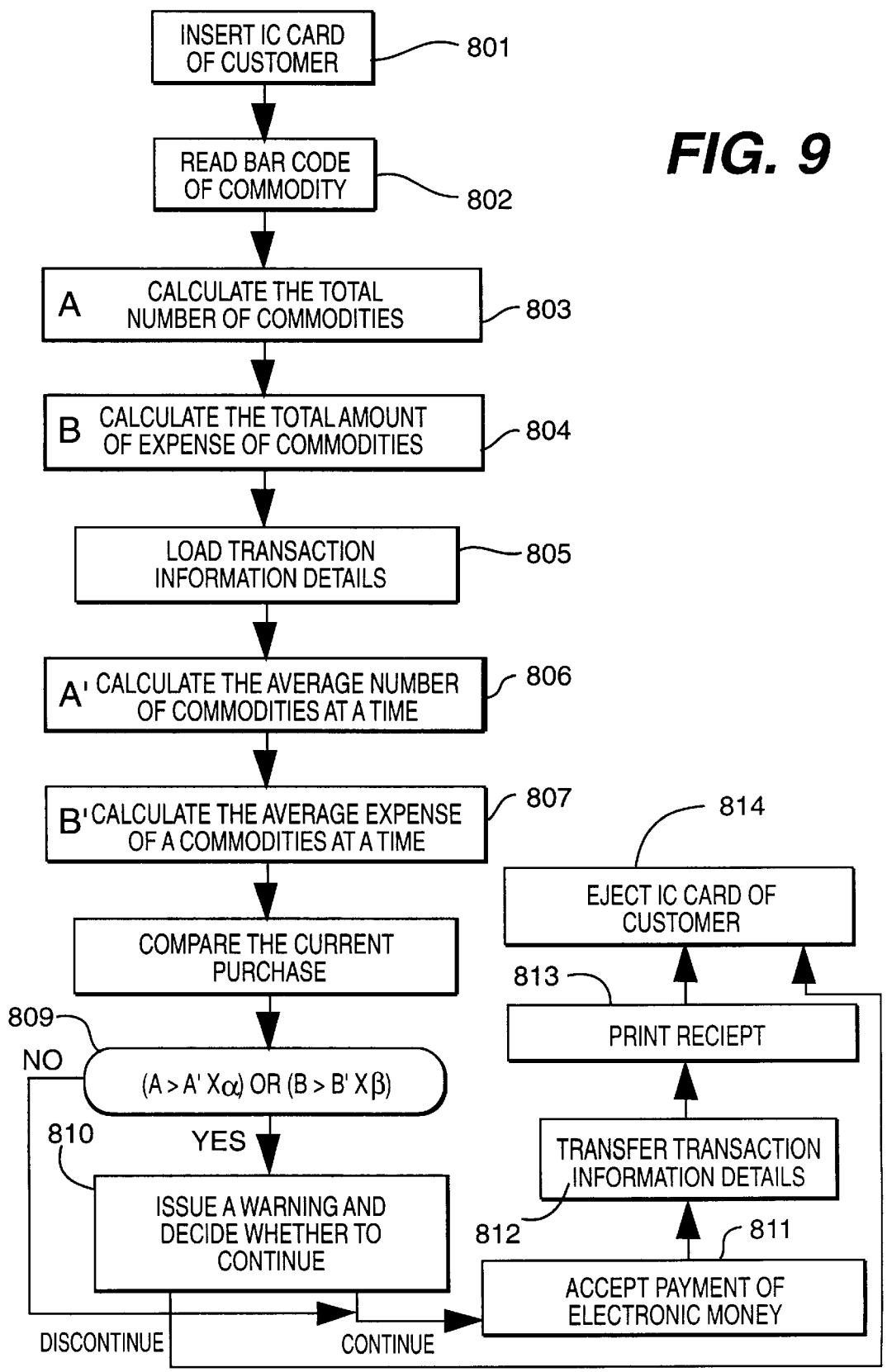
FIG. 9 is a flowchart showing the processing of calculating whether a transaction is within a predetermined range of average transactions based on the history of transactions stored in the IC card.

FIG. 9 is a flowchart showing the steps followed in determining whether a transaction is within a predetermined range of average transactions, according to an embodiment of the invention.

(1) A customer, after completing entry of a password, if necessary, passes an IC card to a store clerk and the IC card is inserted in a POS terminal (Step 801).

(2) The commodity being purchased is read by a bar code reader or information concerning the purchase is otherwise entered into the POS terminal by the clerk (Step 802).

(3) After the purchase information for the commodities has been entered using the bar code reader, for example, the total number and the total cost or expense for the commodities is calculated (Steps 803 and 804).

(4) Assuming that a customer has an agreement or contract with a specific retail store, for example, the POS terminal reads specific transaction information which relates to commodities purchased at that store from the IC card (Step 805).

(5) The POS terminal then calculates the average number of commodities A' and the average expense of the commodities B' from the specific transaction information read from the IC card that relates to the commodities sold by the retail store (Steps 806 and 807).

(6) A comparison is made by the POS terminal between the total number A of the commodities attempting to be purchased with the average number of commodities A' calculated in step 806; and also compares the total amount of expense B with the average amount of expense B' calculated in step 807, as follows. If $A>(A'\times\alpha)$ or $B>(B'\times\beta)$, a warning will be issued in step 810, otherwise the total number of commodities and total expense will be considered to be within an average transaction range, and no warning will be issued so that the flow continues with step 811. Incidentally, $\alpha$ and $\beta$ are parameters which are set by the customer's device or in advance at the store, for example with an electronic wallet, and usually have a value of 1.3 to 1.5, allowing for the purchase of commodities of a greater than average number or of a greater total expense than average without issuing a warning (Steps 808 and 809).

(7) If a warning is issued in sept 809, an explanation for the warning is provided, for example: Number Of Commodities Being Purchased Exceeds Average Number or Total Expense Of Commodities Exceeds Average Total Expense. Then, the store clerk can decide whether to continue or discontinue the transaction after assessing the situation. The warning may reflect a malfunction or an unauthorized use of the IC card. If the transaction is continued, the flow continues to step 811, otherwise the flow continues to step 814 (Step 810).

(8) To continue with the transaction, the payment of electronic money is accepted (Step 811), the transaction information details are transferred to the IC card (Step 812), and a receipt is printed for the transaction (Step 813).

(9) Following the processing of a normal transaction, the IC card of the customer is ejected. The IC card of the customer is also ejected if the operator decides to discontinue the transaction after a warning has been issued In step 810 (Step 814).

As set forth above, the transaction information details provide a retail store which the customer repeatedly visits to determine whether or not the purchase of commodities at the store with the IC card is within a predetermined range of average transactions based on the history of transactions made at that store with the IC card. Further, since a range is provided within which the customer can purchase commodities at the store without a warning being issued, there is little inconvenience to the customer so long as the pattern of purchasing the average number of commodities and commodities of an average total expense is not greatly exceeded.

Accordingly, by making the best use of the transaction data storing function of the IC chip for electronic money provided in the IC card, it is possible to store transaction information details having more contents in one IC card without the need to change the function of the IC chip for electronic money itself. In addition, the stored transaction information details can be used for management of household expenses as well as for transmission of a large amount of commercial information.

As described above, according to the present invention, by making the best use of the transaction data storing function of the IC card for electronic money provided in the IC card, it is possible to store transaction information details having more contents in one IC card without the need to change the function of the IC card for electronic money itself. In addition, the stored transaction information details can be used for management of household expenses as well as for transmission of a large amount of commercial information.

We claim:

1. An electronic money system using IC cards for transferring electronic money by communication of a signal between said IC cards, comprising:

said IC cards having a processor and first memory for storing operations to be performed by said processor in transferring electronic money, wherein said first memory stores money data values to maintain a record of money transfers between said IC cards, said money transfers between said IC cards including a deposit transfer in which money is received from one said IC card and stored in said first memory of another said IC card and a payment transaction in which electronic money stored in said first memory of said another IC card is transferred to any other one of said IC cards; and said IC cards having a second memory for storing information details associated with each said payment transaction.

2. An electronic money system according to claim 1, wherein second memory stores said information details that further include at least one of a price, date and time for each said payment transaction.

3. An electronic money system according to claim 2, wherein said second memory stores said information details that further include at least one of details relating to identifying a commodity that is part of said payment transaction, a quantity of the identified commodity and supplier identification information for the identified commodity.

4. An electronic money system according to claim 1, further including said first memory storing transaction data related to each transfer of electronic money and said second memory storing said information details, said processor using said transaction data in said first memory as an index.

5. An electronic money system using IC cards for transferring electronic money by communication of a signal between said IC cards, comprising:

said IC cards having processor means and first memory means for storing operations to be performed by said processor in transferring electronic money, wherein said first memory stores money data values that record money transfers between said IC cards, said money transfers between said IC cards including deposit transfers in which money is received from one said IC card and stored in said first memory means of another said IC card and payment transactions in which electronic money stored in said first memory of said another IC card is transferred to any other one of said IC cards; and said IC cards having second memory means for storing information details associated with each of said payment transactions.

6. An electronic money system according to claim 1, wherein second memory means for storing said information details further stores at least one of a price, date and time for each said payment transaction.

7. An electronic money system according to claim 2, wherein second memory means for storing said information details further stores at least one of details relating to identifying a commodity that is part of said payment transaction, a quantity of the identified commodity and supplier identification information for the identified commodity.

8. An electronic money system according to claim 1, further including said first memory means storing transaction data related to each transfer of electronic money and said second memory means storing said information details, said processor using said transaction data in said first memory means as an index.

9. A method for recording expenses in an electronic money system using IC cards having a processor for transferring electronic money by communication of a signal between said IC cards, comprising:

recording in a first memory of said IC cards money data values to maintain a record of money transfers between said IC cards, said money transfers between said IC cards including a deposit transfer in which money is received from one said IC card and stored in said first memory of another said IC card and a payment transaction in which electronic money stored in said first memory of said another IC card is transferred to any other one of said IC cards; and further, using said record of money transfers as an index, storing in a second memory information details associated with each said payment transaction that includes at least one of a price, date and time for each said payment transaction; and reading from said second memory and processing said information details with a personal computer with a program for managing expenses.

* * * * *